United States Patent [19]

Woodruff

[11] 4,228,967
[45] Oct. 21, 1980

[54] REEL LOADER CONSTRUCTION

[75] Inventor: Roger D. Woodruff, Hebron, Ind.

[73] Assignee: Champion Corporation, Hammond, Ind.

[21] Appl. No.: 76,832

[22] Filed: Sep. 19, 1979

[51] Int. Cl.³ .............................................. B65H 19/20
[52] U.S. Cl. ................................ 242/86.5 R; 414/546
[58] Field of Search .................. 242/86.5 R, 58.6, 66, 242/86.52, 54 R; 414/546, 501

[56] References Cited

U.S. PATENT DOCUMENTS

| | | | |
|---|---|---|---|
| 2,958,478 | 11/1960 | Petersen | 242/86.5 R |
| 3,820,673 | 6/1974 | McVaugh | 414/546 |
| 3,902,612 | 9/1975 | Hall | 242/86.5 R |
| 4,091,946 | 5/1978 | Krdeft | 242/86.5 R |
| 4,155,518 | 5/1979 | Small | 242/86.5 R |

*Primary Examiner*—Edward J. McCarthy
*Attorney, Agent, or Firm*—McDougall, Hersh & Scott

[57] ABSTRACT

A reel loader having drive means located on a bed employed for supporting cable reels and the like. The reels include a center section for holding the cable with a flange at either end of the center section, each flange defining a rim adapted for engaging the bed. The bed carries reel drive rollers comprising rim engaging surfaces so that at least one rim of a reel loaded onto a bed will engage a rim engaging surface. Driving means for the rollers operate to rotate the reels in either direction whereby cable can be fed from or drawn onto a reel. Control means are associated with the drive means so that the pressure of a rim against a drive roller can be varied for thereby controlling the driving force applied by a drive roller.

10 Claims, 5 Drawing Figures

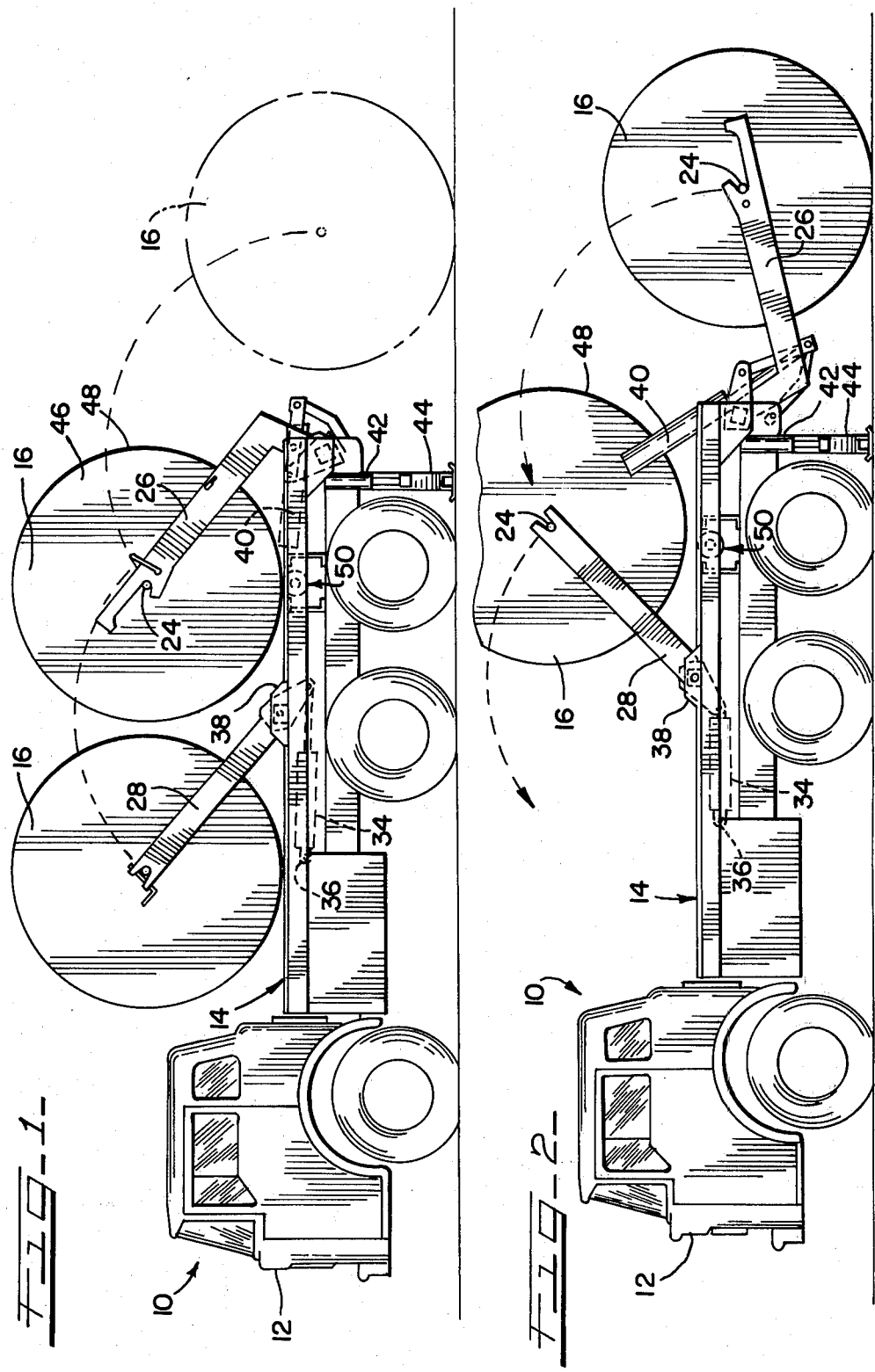

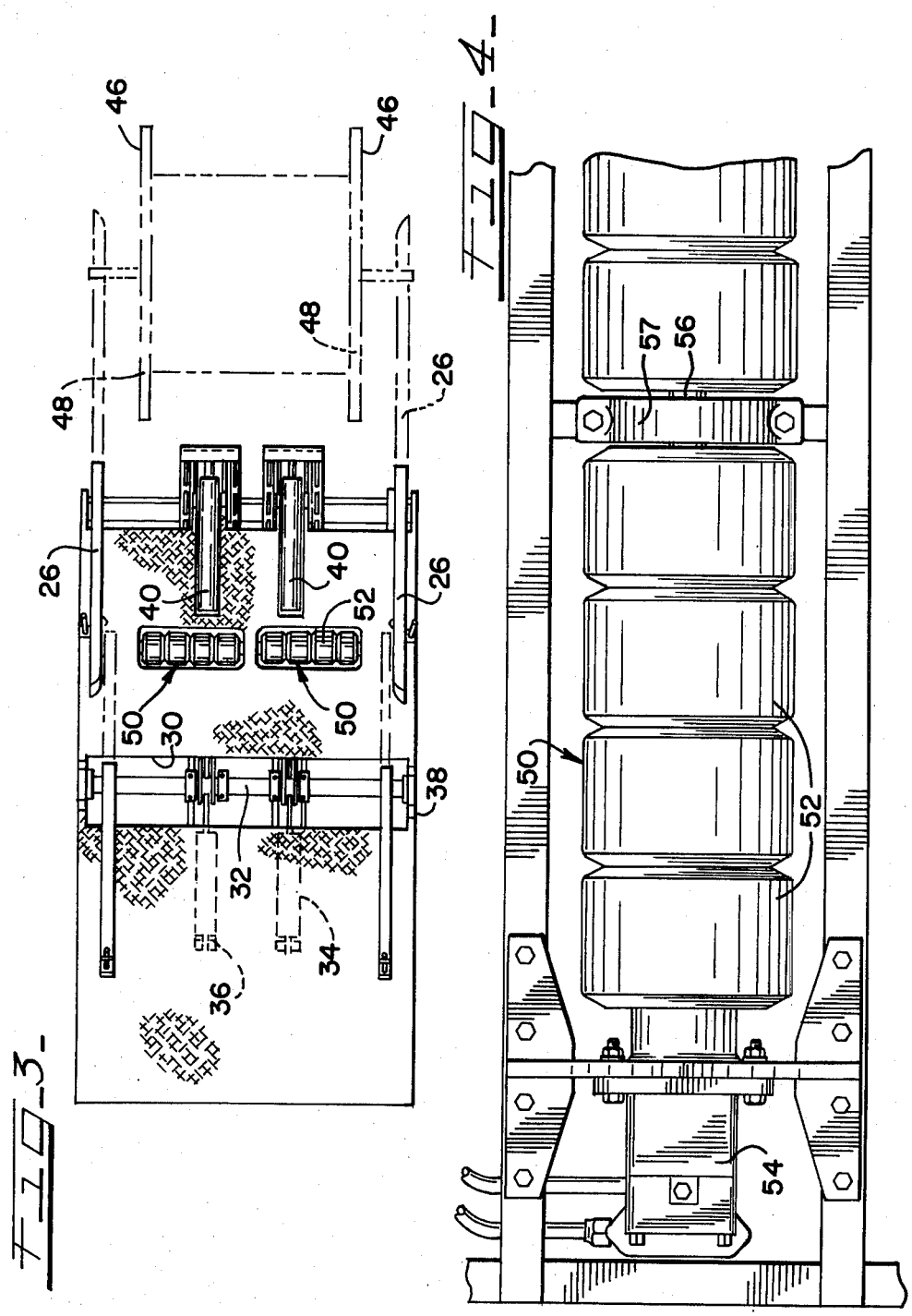

REEL LOADER CONSTRUCTION

BACKGROUND OF THE INVENTION

This invention relates to improvements in reel loaders. Such loaders include mechanisms employed for loading and unloading reels with respect to a supporting bed. The mechanisms are particularly designed for handling relatively large reels which cannot be efficiently handled by individuals, and the mechanisms are preferably of the type carried on the supporting bed. Since the bed may comprise a truck bed, the mechanisms are then available for loading and unloading operations irrespective of the location of the bed.

The mechanisms of this invention are generally of the type employing lift arms pivotally mounted on a supporting bed. Examples of structures of this type are found in U.S. Pat. Nos. 3,184,082; 3,325,118; 3,063,584; and 3,036,790. These patents describe lift arms which are associated with truck beds whereby reels employed for telephone cable and the like can be loaded and unloaded.

McVaugh U.S. Pat. No. 3,820,673 discloses an apparatus for handling cable reels and the like which is especially suited for the handling of structures of various sizes. The apparatus includes mechanisms particularly adapted for adjustability whereby cable reels and other structures can be most efficiently loaded on truck beds and the like with maximum efficiency.

This invention is directed to improvements in such loading and unloading mechanisms, and specific reference will be made to the apparatus of the McVaugh patent which includes the association of the mechanisms with truck beds designed for supporting cable reels and other structures. It will be understood, however, that the invention has utility in other applications involving handling of similar structures on other supporting beds.

SUMMARY OF THE INVENTION

Reel loaders of the type contemplated by this invention operate to handle reels of a standard type including a center section for holding cable and a flange at either end of the center section. Each flange defines a rim which will rest on the bed when a reel has been positioned on the bed.

The invention is particularly directed to reel drive means suitable for rotating a reel located on a bed. The reel can then be utilized for feeding cable or for retracting cable and winding the cable back onto a reel.

The reel drive means preferably comprise drive rollers positioned for engaging at least one rim of a reel. Motor means are provided for driving the rollers in either direction whereby rotation of the reel provides for cable feeding and rewinding. The motor means is included in a control circuit which provides for variations in pressure exerted by the reel rim against a drive roller. This, therefore, provides a means for controlling the driving force exerted by a drive roller.

The invention is particularly adapted to reel loaders which include lift arms for placing reels on a truck bed. Particularly where the lift arms are controlled by hydrualic drive means, the control of the driving force exerted by a drive roller on a reel rim can be efficiently accomplished. Thus, the hydraulic circuitry may include means for operating a hydraulic motor connected to a drive roller, and control means in the circuit can be employed to cause the lift arms to hold a reel rim against a drive roller with varying degrees of pressure. This arrangement provides a highly effective means for achieving the desired control of driving force on a reel.

The preferred form of the invention readily permits rotation of reels for winding and unwinding of cable even where the reels are of varying sizes. Furthermore, the structure of the invention is readily adaptable for use in systems employing one or more sets of transfer arms whereby reel driving can be accomplished on truck beds and the like which are capable of supporting multiple reels.

BRIEF DESCRIPTION OF THE DRAWINGS

FIG. 1 is a side elevation of a truck for loading and unloading reels and including the drive mechanisms of the invention;

FIG. 2 is a side elevation of a truck illustrating the loading and unloading mechanisms in their lifting and transfer positions;

FIG. 3 is a plan view of a supporting bed incorporating the drive mechanisms of the invention;

FIG. 4 is an enlarged fragmentary view illustrating a drive roller structure of the type contemplated by this invention; and, FIG. 5 is a diagram of a hydraulic circuit incorporating the features of this invention.

DETAILED DESCRIPTION OF THE INVENTION

Figure 5:
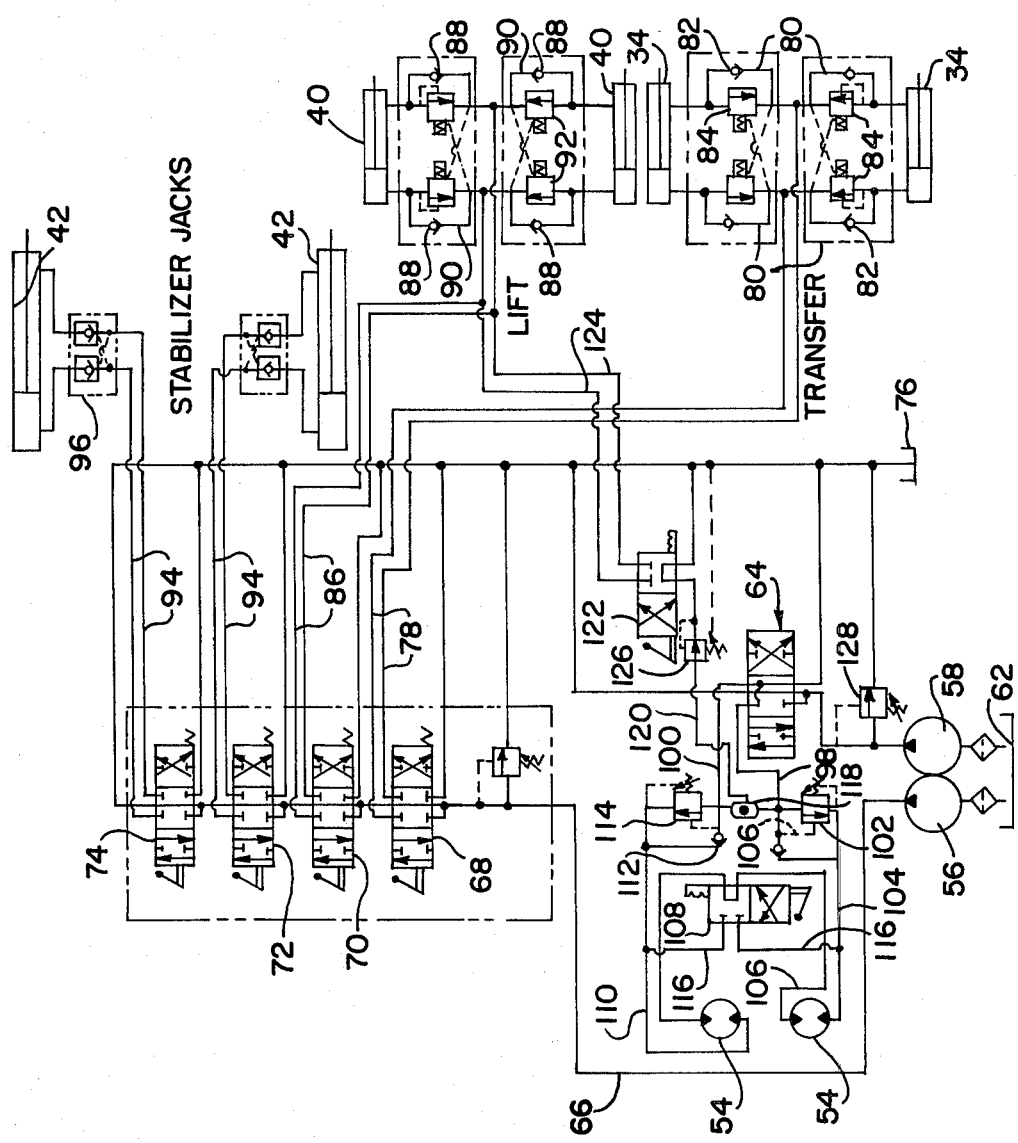

FIGS. 1 and 2 of the accompanying drawings illustrate a truck 10 including a cab section 12 and a truck bed section 14. The invention will be described with reference to such trucks; however, it will be appreciated that the invention may be used for other applications involving reels of the type being discussed.

In FIGS. 1 and 2, the structures identified by the numeral 16 represent cable reels. The truck 10 includes mechanisms suitable for loading and unloading structures of these types from the ground level 20 to the truck bed 14.

The reels 16 include laterally extending rods 24 which are adapted to be engaged by the arms 26 pivotally connected to the truck. Transfer arms 28 are pivotally connected to the truck bed, and these transfer arms are also adapted to engage the rods 24. As indicated, the lift arms 26 serve to move the reels 16 to a rearward position on the truck bed, and the transfer arms 28 serve to move the reels to a forward position whereby reels can be loaded and unloaded from both positions. Obviously, if the truck bed or other supporting surface were of sufficient size, one or more additional sets of transfer arms could be employed for locating reels at one or more additional positions.

An opening 30 is provided in bed 14 for receiving a transfer arm supporting structure which includes supporting shaft 32 (FIG. 3). Cylinder and piston assemblies 34 are pivotally connected at 36 and are tied to supporting shaft 32. The shaft 32 is rotatable in upwardly extending portions 38 of bed 14.

The transfer arms 28 are tied to the shaft 32 in a manner which will prevent relative rotation. The spacing between the transfer arms is preferably adjustable for purposes of accommodating reels of different size, and an intermediate arm may be utilized so that two reels could be handled simultaneously. This type of arrangement is described in the aforementioned McVaugh U.S. patent.

As was described in the aforementioned McVaugh U.S. patent, cylinder and piston assemblies 40 are utilized for controlling the operation of lift arms 26. These lift arms, through appropriate linkage, serve to move reels from the ground onto a truck bed or from the truck bed onto the ground. A detailed description of the linkage employed is found in the McVaugh U.S. patent and it will be appreciated that the invention is also applicable to other systems employing lift arms.

The hydraulic circuitry controlling the operation of the cylinders 34 and 40 may also control cylinder and piston assemblies 42 which operate jacks 44. Particularly where the reel drive means of this invention are in operation, it is desirable to extend the jacks for insuring stability of the truck during winding and unwinding operations.

The reels illustrated include central sections for holding cable with flanges 46 at each end of a central section. The rims 48 defined by the flanges will normally rest on the truck bed 14. In accordance with this invention, drive roller assemblies 50 are positioned on the truck bed for engagement by these rims. Thus, the lift arms 26 support spindle bars 24 which permit rotation of the reels carried thereon, and these spindle bars are automatically positioned in a plane directly above the drive roller axes when the lift arms locate a reel on the bed. It will be appreciated that different sets of drive rollers could be employed where the truck bed is designed to handle reels of different diameters. Alternatively, it is contemplated that the drive rollers could be adjustably mounted relative to the bed to permit handling of reels of different diameter.

The drive roller assemblies include a plurality of rim engaging sections 52. This arrangement permits utilization of the drive rollers for the handling of reels of different width.

As shown in FIG. 4, hydraulic motor 54 is connected to a drive roller assembly 50 with another assembly 50 being connected by means of drive shaft 56 rotatable in center bearing 57. Another motor 54 is mounted on the other side.

FIG. 5 illustrates a hydraulic circuit diagram contemplated for use in connection with the structures described. The diagram illustrates hydraulic pumps 56 and 58 which receive hydraulic fluid from reservoir 62.

The pump 56 serves to feed fluid through line 66 to a series of valves 68 through 74. The valve 68 operates to control transfer arms 28, the valve 70 controls the operation of lift arms 26 and the valves 72 and 74 control the operation of the jacks 44.

In the valve positions illustrated, the fluid will merely circulate between pump 56 and return reservoir 76. If it is desired to operate transfer arms 28 for shifting the position of a reel, valve 68 is operated. The position to which valve 68 is shifted determines the direction of movement of the transfer arms.

As shown, the valve 68 provides for delivery of fluid through one of the lines 78, and this fluid is then divided for delivery to each of the cylinders 34. When being fed to a cylinder, the fluid passes through one set of by-pass lines 80, each of which includes a one-way valve 82. The return flow of the fluid is through one set of the pressure controlled valves 84. It will be noted that the position of a given set of valves 84 is controlled by the pressure in the lines through which the fluid is being fed to the cylinders in accordance with known operating practice.

The operation of lift arms 26 is controlled by valve 70 in similar fashion. Thus, the valve can be shifted to either of two positions for achieving movement of the lift arms in either direction. Fluid is fed through one of the lines 86 to cylinders 40 with one-way valves 88 permitting flow through one set of by-pass lines 90 and pressure controlled valves 92 permitting return flow through the other lines 86.

The respective positions of valves 72 and 74 provide for selective passage of fluid through lines 94 and to and from cylinders 42 by means of the check valve arrangement 96. Again, this arrangement is of standard design and does not form a part of this invention.

The hydraulic operation described is to this point suitable for reel loaders such as those shown in the aforementioned McVaugh U.S. patent. Thus, the hydraulic circuitry is suitable for moving reels from one position to another on a truck bed and for moving reels from the truck bed onto the ground and from the ground onto the truck bed. In accordance with this invention, the circuitry provides in addition means for driving roll assemblies 50 whereby a reel supported by lift arms 26 can be rotated for winding and unwinding cable.

The directional control valve 64 connected to pump 58 is utilized for controlling the operation of the drive rollers. Specifically, the valve 64 can be shifted to either of two positions whereby fluid can be delivered through line 98 or through line 100. In the former case, with the valve shifted from left to right, the fluid is delivered to an adjustable relief valve 102 for passage into line 104. The valve 102 permits the passage of fluid when the pressure build-up in line 106 is sufficient to open the valve. By utilizing the valve 102 in this fashion, drive pressure is not applied to the drive rollers until a minimum pre-load pressure is achieved.

The line 104 is connected to a first motor 54, and the line 106 extending from that motor passes fluid to valve 108. With the valve 108 in the position shown, the fluid is delivered to a second motor 54 and then returned through line 110 and check valve 112 to the reservoir 76. Thus, this embodiment contemplates the provision of a motor 54 for each set of drive rollers 50, and these motors will maintain a constant speed relationship. In the position of the valve 108 shown, the motors 54 are driven in series.

With the valve 64 shifted from right to left from the position shown in FIG. 5, the fluid is delivered through line 100 to adjustable relief valve 114. The fluid then passes through line 110 to one motor 54 and then through valve 108 to the other motor 54. In this fashion, the circuitry provides for operation of the drive rollers in either direction to achieve either winding or unwinding of cable.

Valve 108 operates as a speed selector valve. Specifically, the valve, when shifted to the other position illustrated, serves to operate the motors 54 in parallel thereby reducing the operating speed. Thus, it will be noted that the fluid from lines 98 or 100 is divided with a portion passing through a motor 54 and the remainder through one of the lines 116 for passage through valve 108.

Irrespective of the setting of valve 108, means are provided for controlling the driving force applied to a rim in engagement with a drive roller 52. These means include shuttle valve 118 which communicates by means of line 120 with selector valve 122. The latter is connected by means of lines 124 to the elements controlling the pressure of lift cylinders 40.

Selector valve 122 is an on-off valve which is moved to the open position when automatic control of the driving force applied by a drive roller is desired. In that position, the pressure of fluid being delivered from pump 58 to either line 98 or 100 is applied through the shuttle valve to the lift arm cylinders 40. A pressure-reducing valve 126 is associated with the selector valve 122 to provide a means for adjustably controlling the pressure applied to the lift cylinders.

It will be appreciated that if the lift cylinders operate to pivot lift arms 26 downwardly, this will press a reel rim more firmly against a drive roller. Accordingly, the driving force applied by a drive roller to the rim will be increased.

It will be appreciated that the system described provides for automatic compensation in the event of pressure variations which typically occur due to variations in conditions encountered in the field. Thus, for example, in the embodiment illustrated, the pump 58 is set to deliver fluid under pressure as controlled by relief valve 128. If variations in pressure result due to changes in conditions, these variations will influence the fluid pressure applied to lift cylinders 40. The lift cylinders will either increase or decrease the pressure of the reel rim against the drive rolls. This provides an automatic compensation for the variations in conditions. The result is that a highly efficient operating system, subject to simplified adjustment and control is achieved.

It will be appreciated that the references herein to a "cable" are to be broadly construed, and that lengths of material of various characteristics are included within the definition of this term. It will also be appreciated that the circuitry employed may be supplemented for operation of other devices. For example, winches and tool drive circuits are typically included in the case of vehicles of the type illustrated herein.

Irrespective of the particular arrangement employed, it will be understood that the novel concepts of this invention achieve highly efficient operation. The pressure of a reel rim against drive rollers is maintained in proportion to the conditions encountered. This is of particular value since it saves wear on the drive rollers; slipping of the drive rollers relative to the reel rims is substantially eliminated and it is this slipping which contributes to wear. It will be appreciated that since prior art systems provide for control of lift arm pressures, an operator could manipulate the controls to vary the pressure against drive rollers. Particularly in the case of cable handling operations, however, the operator is often at a remote location and, therefore, the automatic control of this invention eliminates the need for such manual operation.

It will further be understood that various other changes and modifications may be made in the construction described to provide the characteristics of this invention without departing from the spirit thereof particularly as defined in the following claims.

I claim:

1. In a reel loader apparatus comprising a mechanism for loading reels onto a supporting bed and for unloading the reels, the reels comprising a center section for holding cable and side flange sections, each flange section defining a rim engageable with said bed, the improvement comprising reel drive means for rotating a reel about its horizontal axis, rim engaging means defined by said drive means, means supporting said drive means on said bed whereby at least one rim of a reel located on the bed engages a rim engaging means, and motive power means for said drive means, said motive power means being adapted to operate the drive means in either direction whereby cable can be fed from or driven onto a reel, and means associated with said motive power means for varying the pressure applied by said rim to said drive means for thereby varying the driving force of said drive means.

2. An apparatus in accordance with claim 1 wherein said rim engaging means comprise a series of rollers mounted in side-by-side relationship whereby reels of various sizes and located in different positions on the bed can be driven by the drive means.

3. An apparatus in accordance with claim 2 wherein rims defined by both reel flange sections are simultaneously engaged by said drive means.

4. An apparatus in accordance with claim 1 including lift arms associated with said bed for loading and unloading said reels, said means for varying pressure being connected to said lift arms and operating to vary the force applied by the lift arms to a reel for thereby varying the pressure applied by a reel rim to the drive means.

5. An apparatus in accordance with claim 1 wherein said motive power means comprise a hydraulic motor.

6. An apparatus in accordance with claim 5 including lift arms associated with said bed for loading and unloading said reels, said means for varying pressure being connected to said lift arms and operating to vary the force applied by the lift arms to a reel for thereby varying the pressure applied by a reel rim to the drive means, and including at least one hydraulic cylinder for controlling the operation of said lift arms.

7. An apparatus in accordance with claim 6 including a hydraulic pump for feeding fluid to said hydraulic motor and said hydraulic cylinder, and means for detecting the pressure of the fluid applied to the motor and cylinder whereby changes in pressure to the motor result in corresponding changes of pressure to the cylinder.

8. An apparatus in accordance with claim 7 wherein said pump delivers hydraulic fluid through a line to said motor, said detecting means comprising a shuttle valve communicating with said line, and including an additional line delivering hydraulic fluid from said shuttle valve to said cylinder.

9. An apparatus in accordance with claim 8 including a control valve for reversing the direction of fluid flow to said motor, said first mentioned line comprising either of two lines extending from said control valve to said motor, said shuttle valve communicating with one of said two lines depending on the direction of rotation of said motor.

10. An apparatus in accordance with claim 9 wherein said lift arms are pivotally attached to said bed, said cylinder operating to pivot the arms toward and away from the bed, and including a selector valve positioned in said additional line between the shuttle valve and the cylinder, said selector valve having an open and closed position, the selector valve being maintained in the open position when said lift arms hold a reel rim in engagement with said drive means.

* * * * *